United States Patent [19]

Tomura et al.

[11] Patent Number: 5,017,626

[45] Date of Patent: May 21, 1991

[54] VISIBLE LIGHT-CURING POLYESTER RESIN COMPOSITION

[75] Inventors: Yoshihiro Tomura; Shigeki Banno, both of Aichiken, Japan

[73] Assignee: Nippon Oil & Fats Co., Ltd., Tokyo, Japan

[21] Appl. No.: 251,461

[22] Filed: Sep. 30, 1988

[30] Foreign Application Priority Data

Oct. 2, 1987 [JP] Japan .............................. 62-248108
Oct. 2, 1987 [JP] Japan .............................. 62-248109

[51] Int. Cl.$^5$ .......................... C08F 2/50; C08F 4/36; C08F 12/08; C08L 67/06
[52] U.S. Cl. ................................... 522/9; 522/10; 522/13; 522/14; 522/24; 522/107; 502/160
[58] Field of Search .............................. 522/9, 10, 13

[56] References Cited

U.S. PATENT DOCUMENTS

| | | | |
|---|---|---|---|
| 4,045,394 | 8/1977 | Hess | 522/9 |
| 4,208,005 | 6/1980 | Nate | 427/44 |
| 4,407,984 | 10/1983 | Ratcliffe | 523/115 |
| 4,459,193 | 7/1984 | Ratcliffe | 526/208 |
| 4,522,694 | 6/1985 | Schaefer | 522/16 |
| 4,820,744 | 4/1989 | Kubota | 522/14 |

Primary Examiner—Marion E. McCamish
Assistant Examiner—Arthur H. Koeckert
Attorney, Agent, or Firm—Oblon, Spivak, McClelland, Maier & Neustadt

[57] ABSTRACT

A visible light-curing polyester resin composition comprises an unsaturated polyester resin and a photocuring agent composed of an α-diketone, a benzyidimethyl ketal, and at least one member selected from the group consisting of (1) 2-(dimethylamino)-ethyl benzoate, (2) 2-(dimethylamino)-ethyl benzoate plus a peroxy ketal, and (3) a peroxy ketal plus a tertiaryamine.

5 Claims, No Drawings

VISIBLE LIGHT-CURING POLYESTER RESIN COMPOSITION

BACKGROUND OF THE INVENTION

1. Field of the Invention

This invention relates to a composition made up of a specific visible light-curing agent and a polyester resin. More particularly, this invention relates to a visible light-curing polyester resin composition which enjoys a long pot life in a dark place, cures quickly, and to a visible light-curing polyester composition from which there can be cured to form a shaped product which exhibits only slight difference in rigidity between its obverse and reverse sides

2. Prior Art Statement

It has been known that a radically polymerizable unsaturated polyester resin can be cured when it is admixed with a photocuring agent and then exposed to ultraviolet radiation (UV) or visible light. Particularly for the purpose of curing a thin film of resin to be used as a surface coating or ink, a method which specifically makes use of the UV has been established. When the resin is used in the form of a thickly applied layer reinforced with glass fibers, however, the exposure to the UV radiation is not appropriate for curing the resin because the resin itself or the reinforcing glass fibers prevent the radiation from being absorbed enough for thorough curing of the resin. It has been also known that visible light is effective for curing a resin used in the form of a thickly applied layer or reinforced with glass fibers.

Various curing systems of unsaturated polyester resin settable by the visible light have been reported. In the specification of Japanese Patent Publication SHO 60(1985)-15646, for example, a combination of a benzoyloxime carbonate ester derivative with a photoreducing dye such as, for example, eosine, and a tertiary amine as a photocuring agent is proposed. In the specifications of Japanese Patent Publication SHO 54(1979)-10986, SHO 57(1982)-59246, and SHO 60(1985)-8241, combinations of α-diketones with tertiary amines are disclosed. An example using acylophosphine oxide as a photocuring agent is disclosed in the specification of Japanese Patent Publication SHO 60(1985)-8047. Besides, a method which resorts to additional use of a peroxide as a photocuring agent has been known to the art. In the specification of Japanese Patent Publication SHO 57(1982)-202304, for example, a combination using benzophenone or benzil and t-butyl-peroxybenzoate, methylethyl ketone peroxide, or cyclohexanone peroxide as a peroxide is disclosed as a photocuring agent.

The known methods described above, however, suffer from the drawbacks described below.

The polyester resin composition containing as a curing agent the combination of a benzoyloxime carbonate ester derivative, a photoreducing dye, and a tertiary amine does not cure quickly and the shaped article obtained by curing the composition has low rigidity. The reverse side of the shaped product obtained by curing the polyester resin composition containing as a curing agent the combination of an α-diketone and a tertiary amine or an acylophosphine oxide has low rigidity.

The polyester resin composition which contains the photocuring agent additionally using a peroxide has no problem regarding the rigidity of the reverse side of the shaped article. It nevertheless has the disadvantage that the pot life thereof is only about one week.

As described above, none of the conventional visible light-curing agents is known to possess such a quality that the resin incorporating the agent enjoys a long pot life and the shaped article obtained by curing the resin molded in a given shape exhibits physical properties, particularly rigidity, substantially uniformly throughout the entire mass thereof, specifically with sparing difference between the obverse side and the reverse side. One major use of polyester resins is for FRP. The fact that the rigidity of a shaped article differs on the obverse side and the reverse side thereof makes polyester resin practically unfit for the FRP.

OBJECT AND SUMMARY OF THE INVENTION

An object of this invention is to provide a visible light-curing polyester resin composition which enjoys a long pot life and is able to produce a cured shaped product by exposure to visible light which exhibits only a slight difference in rigidity between the obverse side and the reverse side.

To accomplish the object described above, the present invention provides a visible light-curing polyester resin composition substantially comprising 100 parts by weight of an unsaturated polyester resin and a photocuring agent composed of:

(a) 0.1 to 5 parts by weight of an α-diketone, (b) 0.1 to 5 parts by weight of a benzildimethyl ketal, and (c) one member selected from the group consisting of (c') 2 to 15 parts by weight of 2-(dimethylamino)-ethyl benzoate, (c") 2 to 15 parts by weight of 2-(dimethylamino)-ethyl benzoate plus 0.01 to 5 parts by weight of a peroxy ketal, and (c''') 0.01 to 5 parts by weight of a peroxy ketal plus 0.1 to 10 parts by weight of a tertiary amine.

DETAILED DESCRIPTION OF THE PREFERRED EMBODIMENTS

Now, the components to be contained in the composition of this invention will be described below.

The unsaturated polyester resin is an ordinary type of unsaturated polyester resin. It is produced, for example, by using as raw materials an ethylenically unsaturated dibasic acid or anhydride such as maleic anhydride or fumaric acid and a glycol such as ethylene glycol or propylene glycol, subjecting these main raw materials to esterification thereby preparing an unsaturated polyester, and dissolving this unsaturated polyester in a polymerizable vinyl monomer.

The curing agent to be added to the unsaturated polyester resin has as essential components thereof (a) an α-diketone and (b) benzildimethyl ketal and as an additional component thereof (c) one member selected from the group:

(c') 2-(dimethylamino)-ethyl benzoate, (c") 2-(dimethylamino)-ethyl benzoate plus a peroxy ketal, and (c''') a peroxy ketal plus a tertiary amine.

Now, the components of the curing agent will be described in detail below.

The α-diketone as the component (a) is represented by the following formula:

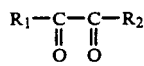

In the formula given above, $R_1$ and $R_2$ independently stand for a hydrocarbon group of 1 to 12 carbon atoms and may be the same or different. $R_1$ and $R_2$ may be bonded to each other either directly or through the medium of a divalent hydrocarbon group. As preferred examples of the α-diketone, benzil and camphorquinone may be mentioned.

The amount of this α-diketone to be used is in the range of 0.1 to 5 parts by weight, desirably 0.3 to 3 parts by weight, and more desirably 0.5 to 2 parts by weight, based on 100 parts by weight of the unsaturated polyester resin. If this amount is less than 0.1 part by weight, the resin composition on exposure to visible light is not cured sufficiently and the shaped article to be consequently produced has low rigidity. If this amount exceeds 5 parts by weight, the resin composition begins to manifest susceptibility to the phenomenon of quenching and the excess of the supply brings about no proportionate addition to the effect of the component.

The amount of the benzildimethyl ketal as the component (b) is in the range of 0.1 to 5 parts by weight, desirably 0.3 to 3 parts by weight, and more desirably 0.5 to 2 parts by weight, based on 100 parts by weight of the unsaturated polyester resin. If this amount is less than 0.1 part by weight, the surface of the shaped article is not sufficiently cured and becomes sticky. If this amount exceeds 5 part by weight, the resin composition begins to show susceptibility to quenching and the excess amount does not proportionately enhance the effect of the component.

Now, the component (c) of the curing agent will be described below.

First, the members (c') and (c'') will be discussed.

The amount of 2-(dimethylamino)-ethyl benzoate is in the range of 2 to 15 parts by weight, desirably 4 to 12 parts by weight, and more desirably 6 to 10 parts by weight, based on 100 parts by weight of the unsaturated polyester resin. If this amount is less than 2 parts by weight, the resin composition is not cured on exposure to the visible light. If it exceeds 15 parts by weight, the excess is wasted because it does not add brings proportionately to the effect of this component.

In the production of a FRP having a large thickness such as, for example, 3 mm or more, the incorporation of a peroxy ketal in the photocuring agent permits more effective prevention of the loss of rigidity on the reverse side of the shaped article.

The peroxy ketal is represented by the following formula.

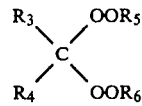

In the formula given above, $R_3$ and $R_4$ independently stand for a hydrocarbon group of 1 to 9 carbon atoms and may be the same or different. $R_3$ and $R_4$ may be bonded to each other either directly or through the medium of a divalent hydrocarbon group. $R_5$ and $R_6$ independently stand for an alkyl group of 4 to 8 carbon atoms and may be same or different. $R_5$ and $R_6$ may be bonded to each other either directly or through the medium of a divalent hydrocarbon group.

As concrete examples of the peroxy ketal, 1,1-bis(t-butylperoxy)-3,3,5-trimethylcyclohexane, 1,1-bis(t-butylperoxy)-cyclohexane, n-butyl-4,4-bis(t-butylperoxy)valerate, 1,1-bis(t-butylperoxy)cyclododecane, and 3,3,6,6,9,9-hexamethyl-1,2,4,5-tetraoxocyclononane can be mentioned.

One, two or more peroxy ketals may be used. The amount of the peroxy ketal to be used is in the range of 0.01 to 5 parts by weight, desirably 0.025 to 3 parts by weight, and more desirably 0.05 to 2 parts by weight, based on 100 parts by weight of the unsaturated polyester resin. If this amount is less than 0.01 part by weight, the resin composition is not cured sufficiently and the produced shaped article does not acquire sufficient rigidity on the reverse side thereof. If this amount exceeds 5 parts by weight, the excess is wasted because it does not add proportionately to the effect of the component.

Now, the member (c''') of the component (c) will be described below.

To be specific, the visible light-curing polyester resin composition also manifests an outstanding quality when a peroxy ketal and a tertiary amine are both incorporated.

The difference between the member (c''') and the member (c') consists in the fact that compared with the member (c''') which is a mixture of two compounds, the member (c') is formed of one compound and enjoys the advantage that it can be mixed easily with the other components of the resin composition. Though the member (c''') and the member (c'') are alike in containing a peroxy ketal, the former is advantageous over the latter in respect that the variety of tertiary amines available for combination is large.

In this case the amount of the peroxy ketal to be added and the reason for the addition thereof are entirely the same as described above.

Now, the tertiary amine will be described.

The tertiary amine is represented by the following formula:

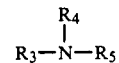

In the formula given above, $R_3$, $R_4$ and $R_5$ independently stand for a hydrocarbon group of 1 to 12 carbon atoms and may be the same or different. Any two of the substituents $R_3$, $R_4$ and $R_5$ may be cyclized in combination with N. As concrete examples of the tertiary amine, trialkyl amines, N-alkylmorpholines, and N-cycloalkylmorpholines can be mentioned. Among alkyl groups, ethyl group and methyl group prove to be particularly desirable. The amount of the tertiary amine to be used is in the range of 0.1 to 10 parts by weight, desirably 1 to 8 parts by weight, and more desirably 2.5 to 6 parts by weight, based on 100 parts by weight of the unsaturated polyester resin. If this amount is less than 0.1 part by weight, the resin composition does not set. If the amount exceeds 10 parts by weight, the effect of the added tertiary amine upon the physical properties of the curing agent is as disadvantageous economically as when the amount is 10 parts by weight. Further, the excess of supply tends to give rise to residual amine.

The visible light-curing polyester resin composition of the present invention enjoys a long pot life in a dark place and cures quickly when it is exposed to visible light. Further, the shaped article obtained by curing the resin composition possesses high rigidity. This rigidity is varies only slightly from one place to another and is varies very little between the obverse side and the reverse side.

In other words, the visible light-curing polyester resin composition of this invention is a novel composition enjoying the heretofore unattainable characteristic curing agent and the pot life of the resin composition were as shown in Table 1.

It will be noted from Table 1 that the resin compositions of Examples 1 and 2 possessed about one month's pot life, the resin compositions of Examples 3, 4, 5 and 6 containing a peroxy ketal possessed two to three weeks' pot life, and the resin compositions of Comparative Experiments 1 and 2 possessed a very short pot life of 12 hours.

TABLE 1

| Composition of Photocuring Agent (gram) | Example and Comparative Experiment | | | | | | | |
|---|---|---|---|---|---|---|---|---|
| | Example | | | | | | Comparative Experiment | |
| | 1 | 2 | 3 | 4 | 5 | 6 | 1 | 2 |
| camphorquinone | 1 | | 1 | | 1 | | 1 | 1 |
| benzil | | 1 | | 1 | | 1 | | |
| N-ethylmorpholine | | | | | | | | 3 |
| 2-(dimethylamino)-ethyl benzoate | 3 | 3 | 3 | 3 | 3 | 3 | 3 | |
| 3M (Note 1) | | | 0.5 | | | | | |
| C (Note 2) | | | | 0.5 | | | | |
| V (Note 3) | | | | | 0.5 | | | |
| CD (Note 4) | | | | | | 0.5 | | |
| t-butylperoxy benzoate | | | | | | | 0.5 | 0.5 |
| benzildimethyl ketal | 1 | 1 | 1 | 1 | 1 | 1 | 1 | 1 |
| pot life (in dark place at 25° C.) (day) | 31 | 31 | 21 | 16 | 18 | 19 | 12 (hours) | 12 (hours) |

(Note 1) 1,1-bis(t-butylperoxy)-3,3,5-trimethyl cyclohexane
(Note 2) 1,1-bis(t-butylperoxy)cyclohexane
(Note 3) n-butyl-4,4-bis(t-butylperoxy)valerate
(Note 4) 1,1-bis(t-butylperoxy)cyclododecane merits that the resin composition itself has a long pot life, the shaped article possesses high rigidity, the rigidity varies little throughout the entire mass of the shaped article, and the difference in rigidity is small between the obverse side and the reverse side of the shaped article.

Now, the present invention will be described more specifically below with reference to working examples and comparative experiments.

A. Examples containing (c') or (c'') in curing agent.
(Determination of pot life)

EXAMPLES 1 to 6

Visible light-curing polyester resin compositions of this invention were obtained by mixing each of various photocuring agents of differing compositions with 100 grams of an unsaturated polyester resin composed of 65 parts by weight of an unsaturated polyester obtained by condensing 2 moles of propylene glycol and possessing an average molecular weight of 2,700 and 35 parts by weight of styrene monomer.

Then, 30 grams of each of the compositions was placed in a test tube. The tube was stoppered and left standing in a dark place kept at 25° C. The time required for the composition to form gel therein was clocked and was reported as the pot life of the composition. The composition of the photocuring agent added to the resin and the pot life were as shown in Table 1.

COMPARATIVE EXPERIMENTS 1 AND 2

A resin composition for Comparative Experiment 1 was obtained by adding t-butylperoxy benzoate plus the curing agent of Example 1 to 100 g of the same polyester resin as used in the examples mentioned above and a resin composition for Comparative Experiment 2 was obtained by following the procedure of Comparative Experiment 1, except that N-ethylmorpholine was used in the place of 2-(dimethylamino)-ethyl benzoate. These resin compositions were tested for pot life in the same manner as in the examples. The composition of the (Determination of curing speed and rigidity of shaped article)

EXAMPLES 7 TO 9 AND COMPARATIVE EXPERIMENTS 3 TO 7

Resin compositions of the present invention respectively identical in composition to the resin compositions of Examples 1, 3 and 5 were used in Examples 7, 8 and 9, a resin composition identical to the resin composition of Example 1 except for substitution of N-ethylmorpholine for the 2-(dimethylamino)-ethyl benzoate in the photocuring agent was used in Comparative Experiment 3, a resin composition identical to the resin composition of Comparative Experiment 2 was used in Comparative Experiment 4, and resin compositions identical to the resin composition of Example 1 except for omission respectively of the members of the photocuring agent, i.e. camphorquinone, 2-(dimethylamino)-benzoate, and benzildimethyl ketal were used in Comparative Experiments 5, 6, and 7. These resin compositions were cured by exposure to visible light to determine curing speed and rigidity.

The determination was carried out as follows. A sample resin composition, 7 grams, was placed in a cylindrical container about 5 cm in diameter and 1.5 cm in height, placed 7 cm directly below six 20-W daylight-color fluorescent lamps (about 20,000 luxes in luminance), and left curing by exposure to the light from the lamps. The curing time (elapsing before arrival of the temperature at the highest level) was determined by having a thermocouple inserted through the axis of the resin sample and causing this thermocouple to register a curve of heat generated during the curing. On the day following the curing treatment, the rigidity of the cured sample on the obverse and reverse sides was measured with a Barcol hardness tester 934-(1). The results are shown in Table 2. (Preparation of cured shaped article—FRP plate—and physical properties thereof)

EXAMPLES 10 AND 11

FRP plates were produced from resin compositions and tested for physical properties.

From visible light-curing polyester resin compositions of this invention obtained in Example 1 and Example 3, FRP plates were produced as follows. These FRP plates were tested for curing time and rigidity. The results are shown in Table 2 as those of Example 10 and Example 11.

Three superposed glass mats, #450, were impregnated with 30 g of a sample of each of the resin compositions mentioned above, to obtain a laminate. The laminate was placed 7 cm directly below the same fluorescent lamps as used in Examples 7 to 11 and left curing by exposure to the light from the lamps, to obtain a FRP plate.

In the case of the FRP plates, the prevention of the fall of rigidity on the reverse side in particular was obtained advantageously when a peroxy ketal was additionally used as demonstrated in Examples 10 and 11.

B. Examples using member (c′″) in curing agent (Determination of pot life)

EXAMPLES 12 TO 18

Visible light-curing polyester resin compositions were obtained by admixing each of various photocuring agent of differing compositions to 100 grams of an unsaturated polyester resin composed of 65 parts by weight of an unsaturated polyester possessing an average molecular weight of 2,700 and obtained by condensing 1 mole of orthophthalic acid, 1 mole of fumaric acid, and 2 moles of propylene glycol. These resin compositions were tested for pot life in the same manner as in Examples 1 to 6.

The composition of photocuring agent added to the resin and the pot life found are shown in Table 3.

TABLE 2

| Physical properties | Example and Comparative Experiment | | | | | | | | | |
|---|---|---|---|---|---|---|---|---|---|---|
| | Example | | | | | Comparative Experiment | | | | |
| | 7 | 8 | 9 | 10 | 11 | 3 | 4 | 5 | 6 | 7 |
| Curing time (min.) | 7 | 7 | 7 | 8 | 8 | 7 | 7 | No curing obtained | No curing obtained | 12 |
| Rididity (Barcol hardness) | | | | | | | | | | |
| Obverse side | 35 | 36 | 37 | 45 | 50 | 36 | 35 | | | 20 |
| Reverse side | 35 | 37 | 37 | 42 | 49 | 29 | 35 | | | 19 |

These examples and comparative experiments indicate the following fact. When the photocuring agent contained t-butylperoxy benzoate in the place of a peroxy ketal as in Comparative Experiment 4, the rigidity on the reverse side of the cured article differed only slightly from that on the obverse side as compared with the sample of Comparative Experiment 3 while the pot life was extremely short as already demonstrated in Comparative Experiment 2.

As shown in Comparative Experiments 5 and 6, the sample failed to cure when the photocuring agent lacked either comphorquinone or 2-(dimethylamino)ethyl benzoate. The curing speed was slow and the rigidity was low on both the obverse side and the reverse side as shown in Comparative Experiment 7 when benzildimethyl ketal was absent from the curing agent. When visible light-curing resin compositions of this invention were used as shown in Examples 7 to 9, the difference in rigidity between the obverse side and the reverse side of the cured article was small, the rigidity itself was high, and the pot life was long as already demonstrated in Examples 1 to 6.

COMPARATIVE EXPERIMENTS 8 TO 11

A resin composition using 100 g of polyester resin identical in composition to the polyester resin of Examples 12 to 18 and conforming to this invention except for omission of a peroxy ketal from the curing agent was used in Comparative Experiment 8 and resin compositions not containing a peroxy ketal but containing one of various peroxides other than peroxy ketal were used in Comparative Experiments 9, 10 and 11. These resin compositions were treated and tested for pot life in entirely the same manner as in the examples. The composition of the curing agent the pot life are shown in table 3.

The resin compositions of the examples all possessed about three weeks' pot life. The resin composition of Comparative Experiment 8 possessed a long pot life of 31 days, while the resin compositions of Comparative Experiments 9 to 11 possessed very short pot life.

TABLE 3

| Composition of Photocuring Agent (gram) | Example and Comparative Experiment | | | | | | | | | | |
|---|---|---|---|---|---|---|---|---|---|---|---|
| | Example | | | | | | | Comparative Experiment | | | |
| | 12 | 13 | 14 | 15 | 16 | 17 | 18 | 8 | 9 | 10 | 11 |
| camphorquinone | 1 | 1 | 1 | 1 | 1 | 1 | | 1 | 1 | 1 | |
| benzil | | | | | | | 1 | | | | 1 |
| N-ethylmorpholine | 3 | 3 | 3 | 3 | 3 | | 3 | 3 | 3 | 3 | 3 |
| triethylamine | | | | | | 3 | | | | | |
| 3M (Note 1) | 0.5 | | | | | 0.5 | 0.5 | | | | |
| C (Note 2) | | 0.5 | | | | | | | | | |
| V (Note 3) | | | 0.5 | | | | | | | | |
| CD (Note 4) | | | | 0.5 | | | | | | | |
| 25 (Note 5) | | | | | 0.5 | | | | | | |
| t-butylperoxy benzoate | | | | | | | | | 0.5 | | 0.5 |
| benzoylperoxide | | | | | | | | | | 0.5 | |
| benzildimethyl ketal | 1 | 1 | 1 | 1 | 1 | 1 | 1 | 1 | 1 | 1 | 1 |
| Pot life (in dark place at 25° C.) | 21 | 18 | 19 | 20 | 21 | 21 | 20 | 31 | 12 | few | 11 |

TABLE 3-continued

| Composition of Photocuring | Example and Comparative Experiment | | | | | | | | | | |
|---|---|---|---|---|---|---|---|---|---|---|---|
| | Example | | | | | | | Comparative Experiment | | | |
| Agent (gram) | 12 | 13 | 14 | 15 | 16 | 17 | 18 | 8 | 9 | 10 | 11 |
| (day) | | | | | | | | (hours) | minute | (hours) | |

(Note 1) 1,1-bis(t-butylperoxy)-3,3,5-trimethyl cyclohexane
(Note 2) 1,1-bis(t-butylperoxy)cyclohexane
(Note 3) n-butyl-4,4-bis(t-butylperoxy)valerate
(Note 4) 1,1-bis(t-butylperoxy)cyclododecane
(Note 5) 3,3,6,6,9,9-hexamethyl-1,2,4,5-tetraoxocyclononane (Determination of curing speed and rigidity of shaped article)

EXAMPLES 19 TO 23 AND COMPARATIVE EXPERIMENTS 12 TO 17

Resin compositions conforming to this invention identical respectively to the resin compositions of Examples 12, 13, 14, 15 and 16 were tested in Examples 19, 20, 21, 22 and 23. A resin composition identical in composition to the resin composition of Comparative Experiment 8, a resin composition identical in composition to the resin composition of Comparative Experiment 9, and a resin composition identical in composition to the resin composition of Example 12, except for omission of a photocuring agent, i.e. camphorquinone, N-ethylmorpholine, benzildimethyl ketal, or 1,1-bis(t-butylperoxy)-3,3,5-trimethyl cyclohexane, were tested respectively in Comparative Experiments 12, 13, 14, 15, 16 and 17. These resin compositions were cured by exposure to visible light and tested for curing speed and rigidity.

The test was carried out in entirely the same manner as in Examples 7 to 9 and Comparative Experiments 3 to 7.

The results are shown in Table 4.

TABLE 4

| Physical | Example and Comparative Experiment | | | | | | | | | | |
|---|---|---|---|---|---|---|---|---|---|---|---|
| | Example | | | | | Comparative Experiment | | | | | |
| Properties | 19 | 20 | 21 | 22 | 23 | 12 | 13 | 14 | 15 | 16 | 17 |
| Curing time (min.) | 7 | 7 | 7 | 7 | 7 | 10 | 6 | No curing obtained | No curing obtained | 8 | 8 |
| Highest temperature of generated heat (°C.) | 101 | 100 | 96 | 98 | 97 | 102 | 101 | | | 96 | 97 |
| Rididity (Barcol hardness) | | | | | | | | | | | |
| Obverse side | 37 | 35 | 35 | 35 | 35 | 36 | 33 | | | 30 | 36 |
| Reverse side | 39 | 48 | 40 | 40 | 39 | 29 | 33 | | | 36 | 28 |

The resin composition of Comparative Experiment 12 which lacked a peroxy ketal, showed low rigidity on the reverse side of the shaped article. In the case of the resin composition of Comparative Experiment 13 which contained t-butylperoxy benzoate in the place of a peroxy ketal, the shaped article showed improved rigidity on the reverse side substantially equally to that on the obverse side. This resin composition, however, possessed an extremely short pot life as demonstrated already in Comparative Experiment 9. The resin compositions failed to cure when camphorquinone was absent as demonstrated in Comparative Experiments 14 and 15. The resin compositions were cured insufficiently because the rigidity was low on the obverse side in the absence of benzildimethyl ketal and on the reverse side in the absence of a peroxy ketal as demonstrated respectively in Comparative Experiments 16 and 17. In contrast, the difference in rigidity between the obverse side and the reverse side was small and the rigidity itself was high when a peroxy ketal was additionally used as demonstrated in Examples 19 to 23. These resin compositions possessed a long pot life as already demonstrated in Examples 12 to 19.

EXAMPLES 24 TO 29

Resin compositions identical to the resin composition of Example 12 except for changes in the amount of camphorquinone were used in Examples 24 and 25, resin compositions identical thereto except for changes in amount and kind of amine were used in Examples 26 and 29, and resin compositions identical thereto except for changes in the amount of peroxy ketal were used in Examples 27 and 28. These resin compositions were cured by exposure to visible light in entirely the same manner as in Examples 7 and 9 and tested for curing time, highest temperature of heat, and rigidity. The composition of the curing agent in the resin composition and the results of the test are shown in Table 5. It is clearly noted from Table 5 that the cured shaped articles using the resin compositions of these examples showed small differences in rigidity between the obverse side and the reverse side.

TABLE 5

| Composition of curing agent (% by weight) | Example | | | | | |
|---|---|---|---|---|---|---|
| (based on the amount of polyester resin) | 24 | 25 | 26 | 27 | 28 | 29 |
| camphorquinone | 0.5 | 2 | 1 | 1 | 1 | 1 |
| N-ethylmorpholine | 3 | 3 | 6 | 3 | 3 | |
| triethylamine | | | | | | 3 |
| 3M (Note 1) | 0.5 | 0.5 | 0.5 | 1 | 2 | 0.5 |
| benzildimethyl ketal | 1 | 1 | 1 | 1 | 1 | 1 |
| Curing Time (min.) | 8 | 7 | 7 | 7 | 7 | 10 |
| Highest temperatures of generated heat (°C.) | 97 | 96 | 102 | 99 | 98 | 90 |
| Rididity (Barcol hardness) | | | | | | |
| Obverse side | 37 | 35 | 35 | 35 | 36 | 35 |
| Reverse side | 37 | 38 | 38 | 40 | 38 | 35 |

(Note 1) 1,1-bis(t-butylperoxy)-3,3,5-trimethyl cyclohexane (Production of shaped article—FRP plate—and physical properties)

EXAMPLES 30 AND COMPARATIVE EXPERIMENTS 18 AND 19

FRP plates were produced from resin compositions and tested for physical properties.

Namely, as raw material for producing the FRP plates, there were used the visible light-curing polyester resin composition of this invention used in Example 12 (Example 30), the resin composition used in Comparative Experiment 8 (Comparative Experiment 9 (Comparative Experiment 19). The content of the curing agent in the resin composition is expressed in % by weight based on the amount of the resin in Table 6. Three sets of three superposed #450 glass mats were prepared and each set was impregnated with a different one of said resin compositions to produce a laminate. Each laminate was placed 7 cm directly below the same fluoroescent lamps as used in Example 10 and exposed to the light from the lamps for seven minutes. The FRP plates consequently obtained were subjected to a bending test in accordance with the method of Japanese Industrial Standard (JIS) K-7203 to determine bending stress at rupture and modulus of elasticity.

Separately, cast plates (containing no glass fibers) were obtained by exposing said resin compositions to the light from the same lamps as mentioned above for a fixed period of 30 minutes. The cast plates were tested for temperature distribution of dynamic viscosity with a rheograph solid (made by Toyo Seiki). The cross-linking density ($\sigma$) was calculated by applying the storage modulus of elasticity (E') in the rubber region to the Tobolsky's formula of ideal rubber state, $\sigma = dE'RT/3$.

In the formula given above, d stands for the density of resin, R for the gas constant, and T for the absolute temperature.

The composition of the curing agent in the resin composition and such physical properties as cross-linking density and residual styrene content of the FRP plate and the cast plate are shown in Table 6.

It will be noted from Table 6 that the shaped articles, both FRP plates and cast plates, produced from the resin compositions conforming to the present invention invariably excelled in physical properties.

TABLE 6

| Composition of curing agent (% by weight based on rein) | Example 30 Same with Ex. 1 | Comparative Experiment 18 Same with Comparative Experiment 8 | Comparative Experiment 19 Same with Comparative Experiment 9 |
|---|---|---|---|
| camphorquinone | 1 | 1 | 1 |
| N-ethylmorpholine | 3 | 3 | 3 |
| 3M (Note 1) | 0.5 | | |
| t-butylperoxy benzoate | | | 0.5 |
| benzildimethyl ketal | 1 | 1 | 1 |
| Rididity (Barcol hardness) | | | |
| Obverse side | 50 | 45 | 50 |
| Reverse side | 48 | 42 | 48 |
| Bending stress at rupture (kg · f/mm$^2$) | 7.2 | 7.0 | 6.4 |
| Modulus of elasticity (kg · f/mm) | 1080 | 1070 | 1070 |
| Cross-linking density (10$^3$ mol/cc) | 3.2 | 2.9 | 3.2 |
| Residual styrene content (%) | 3.5 | 5.9 | 3.8 |

(Note 1) 1,1-bis(t-butylperoxy)-3,3,5-trimethyl cyclohexane

What is claimed is:

1. A visible light-curing polyester resin composition, consisting essentially of:
    100 parts by weight of an unsaturated polyester resin prepared by reacting an ethylenically unsaturated dibasic acid or anhydride with a glycol, and a polymerizable vinyl monomer and a photocuring agent consisting of:
    (a) 0.1 to 5 parts by weight of an $\alpha$-diketone,
    (b) 0.1 to 5 parts by weight of a benzildimethyl ketal, and
    (c) a member selected from the group consisting of:
        (i) 2 to 15 parts by weight of 2-(dimethylamino)-ethyl benzoate plus 0.01 to 5 parts by weight of a peroxy ketal, and
        (ii) 0.01 to 5 parts by weight of a peroxy ketal plus 0.1 to 10 parts by weight of a tertiary amine.

2. Visible light-curing polyester resin composition according to claim 1, wherein said $\alpha$-diketone is one member selected from the group consisting of benzil and camphorquinone 3. A visible light-curing polyester resin composition according to claim 5, wherein said peroxy ketal is at least one member selected from the group consisting of 1,1-bis(t-butylperoxy)-3,3,5-trimethylcyclohexane, 1,1-bis(t-butylperoxy)cyclohexane, n-butyl-4,4'-bis(t-butylperoxy)-valerate, 1,1-bis(t-butylperoxy)cyclododecane, and 3,3,6,6,9,9-hexamethyl-1,2,4,5-tetraoxocyclononane.

4. A visible light-curing polyester resin composition according to claim 5, wherein said tertiary amine is at least one member selected from the group consisting of N-ethyl morpholine and trialkylamines.

5. A visible light-curing polyester resin composition, consisting essentially of;
    100 parts by weight of an unsaturated polyester resin prepared by polymerizing an ethylically unsaturated dibasic acid or anhydride and a glycol, and a polymerizable vinyl monomer and a photocuring agent consisting of:
    (a) 0.1 to 5 parts by weight of an $\alpha$-diketone,
    (b) 0.1 to 5 parts by weight of a benzildimethyl ketal, and
    (c) a member selected from the group consisting of:
        (i) 0.01 to 5 parts by weight of 1,1-bis(t-butylperoxy)-3,3,5-trimethylcyclohexane, and
        (ii) 0.1 to 10 parts by weight of N-ethyl morpholine.

* * * * *